US009280012B2

(12) United States Patent
Bae

(10) Patent No.: US 9,280,012 B2
(45) Date of Patent: Mar. 8, 2016

(54) WINDOW AND DISPLAY DEVICE

(71) Applicant: Samsung Display Co., Ltd., Yongin, Gyeonggi-Do (KR)

(72) Inventor: Kyu-Han Bae, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 163 days.

(21) Appl. No.: 14/218,936

(22) Filed: Mar. 18, 2014

(65) Prior Publication Data

US 2014/0293581 A1    Oct. 2, 2014

(51) Int. Cl.
G02F 1/13357    (2006.01)
F21V 23/04      (2006.01)
G02F 1/1333     (2006.01)

(52) U.S. Cl.
CPC ........ *G02F 1/13338* (2013.01); *F21V 23/0485* (2013.01); *G02F 2001/133331* (2013.01); *G02F 2201/503* (2013.01); *G02F 2202/28* (2013.01)

(58) Field of Classification Search
CPC ................ G02F 1/13338; G02F 2001/133331; G02F 2201/503; G02F 2202/28; F21V 23/0485
See application file for complete search history.

(56) References Cited

U.S. PATENT DOCUMENTS

| 8,169,332 | B2* | 5/2012 | Son | G06F 3/0414 178/18.01 |
| 2012/0025701 | A1 | 2/2012 | Bertram | |
| 2012/0069444 | A1* | 3/2012 | Campbell | B60R 1/12 359/630 |
| 2012/0127091 | A1* | 5/2012 | Kim | G02F 1/13338 345/173 |
| 2013/0077018 | A1* | 3/2013 | Kuniyoshi | G06F 3/0412 349/58 |
| 2013/0242522 | A1* | 9/2013 | Yoo | H05K 5/0017 361/807 |
| 2013/0257808 | A1* | 10/2013 | Chen | G06F 3/042 345/175 |

FOREIGN PATENT DOCUMENTS

| JP | 2004-038581 A | 2/2004 |
| KR | 10-1084869 B1 | 11/2011 |
| KR | 10-2012-0014142 | 2/2012 |
| KR | 10-2012-0014142 A | 2/2012 |

OTHER PUBLICATIONS

Sarada et al, Machine English Translation of JP 2004-38581 A, "Display Device and Manufacturing Method", Feb. 5, 2004.*

* cited by examiner

*Primary Examiner* — Alan Cariaso
(74) *Attorney, Agent, or Firm* — Lewis Roca Rothgerber Christie LLP

(57) ABSTRACT

A window configured to be laminated on a display panel by resin, the display panel including a display area configured to display an image and a non-display area adjacent the display area includes a window main body configured to cover the display panel; a groove in a region corresponding to the non-display area of the display panel, the groove being recessed from a surface of the window main body facing the display panel; and a touch portion within the groove and configured to recognize a touch.

7 Claims, 5 Drawing Sheets

WINDOW AND DISPLAY DEVICE

RELATED APPLICATIONS

This application claims priority to and the benefit of Korean Patent Application No. 10-2013-0033065 filed in the Korean Intellectual Property Office on Mar. 27, 2013, the entire content of which is incorporated herein by reference.

BACKGROUND

1. Field

Embodiments of the present invention relate to a window and a display device, and more particularly, to a display device having a window laminated to a display panel.

2. Description of the Related Art

As used herein, a "display device" refers to a device for displaying an image, and organic light emitting diode (OLED) display devices are currently in the spotlight.

The OLED display device has a self-light emitting characteristic and, in contrast to a liquid crystal display (LCD) device, does not require a separate light source, and thus, it is possible to decrease thickness and weight of the OLED display device. Also, the OLED display device exhibits high quality characteristics such as low power consumption, high luminance, and high reaction speed, and the like.

Currently, in order to reduce the thickness of a display device, which may be a component of a smart phone or the like, a display device having a window is laminated to a display panel using a resin, where the display panel may be an OLED display device and the like, and where the display device is supplied to display device manufacturing companies.

The above information disclosed in this Background section is only for enhancement of understanding of the background of the described technology and therefore it may contain information that does not form the prior art that is already known in this country to a person of ordinary skill in the art.

SUMMARY

Embodiments of the present invention are directed to a window configured to be easily laminated on a display panel using resin, and a display device including the same.

An exemplary embodiment provides a window configured to be laminated onto a display panel by resin, the display panel including a display area configured to display an image and a non-display area adjacent the display area, the window including: a window main body configured to cover the display panel; a groove in a region corresponding to the non-display area of the display panel, the groove being recessed from a surface of the window main body facing the display panel; and a touch portion within the groove and configured to recognize a touch.

The groove may extend in one direction.

The window may further include a backlight unit adjacent the touch portion and within the groove, the backlight unit being configured to emit light.

The window may further include a light blocking portion adjacent an end portion of the backlight unit and between an inner wall of the groove and the backlight unit.

The light blocking portion may include a first light blocking sub-portion and a second light blocking sub-portion facing the first light blocking sub-portion, the backlight unit being between the first light blocking sub-portion and the second light blocking sub-portion.

Another exemplary embodiment provides a display device, including: a display panel including a display area configured to display an image and a non-display area adjacent the display area; and the window according to an above embodiment laminated on the display panel by resin.

The display panel of the display device may include an organic light emitting diode (OLED) configured to display the image.

DETAILED DESCRIPTION

Figure 1:
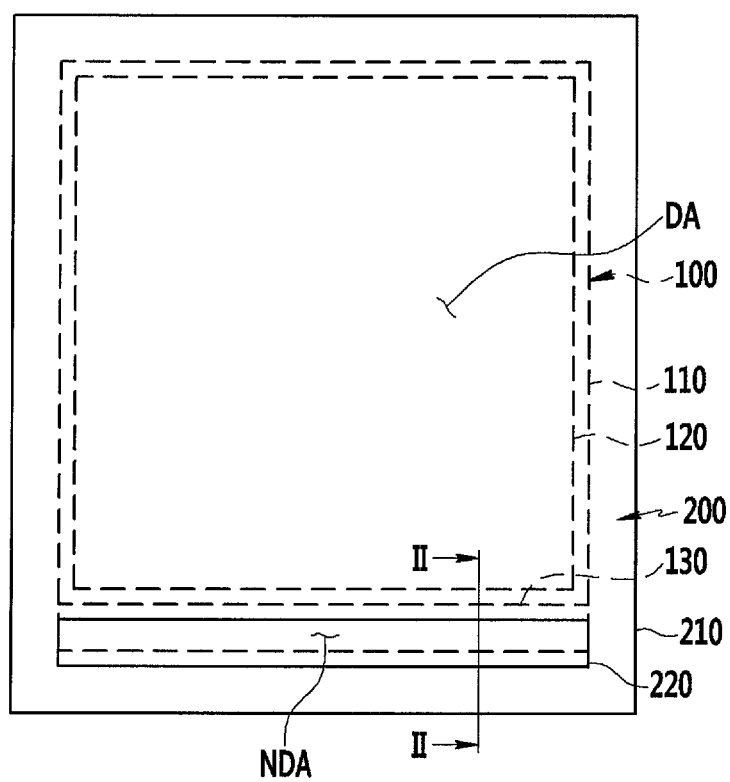
FIG. 1 is a plan view illustrating a display device according to a first exemplary embodiment of the present invention.

Hereinafter, exemplary embodiments will be described in detail with reference to the accompanying drawings to be easily implemented by those skilled in the art.

Embodiments of the present invention may be configured in various different forms and is not limited to the exemplary embodiments described herein.

To clearly describe embodiments of the present invention, portions irrelevant to a description may be omitted, and like reference numerals refer to like constituent elements throughout the present specification.

Also, in various exemplary embodiments, constituent elements having an identical configuration will be representatively described in a first exemplary embodiment using like reference numerals. In other exemplary embodiments, only components different from the first exemplary embodiment will be described.

Also, size and thickness of each configuration illustrated in the drawings are arbitrarily illustrated for better understanding and ease of description and thus, the present invention is not essentially restricted thereby.

In the drawings, the thickness of layers, films, panels, regions, etc., are enlarged for clarity. Further, in the drawings, the thickness of a portion of the layers, the film, the panels, the regions, etc., are exaggerated for better understanding and ease of description. It will be understood that when an element such as a layer, a film, a region, or a substrate is referred to as being "on" another element, it can be directly on the other element or intervening elements may also be present.

In addition, unless explicitly described to the contrary, the word "comprise" and variations such as "comprises" or "comprising", will be understood to imply the inclusion of stated elements but not the exclusion of any other elements. Further, in the specification, the word "on" means positioning on or below the object portion, but does not essentially mean positioning on the upper side of the object portion based on a gravity direction.

Hereinafter, a display device 1000 according to a first exemplary embodiment of the present invention will be described with reference to FIGS. 1, 2, 3, and 4.

Figure 2:
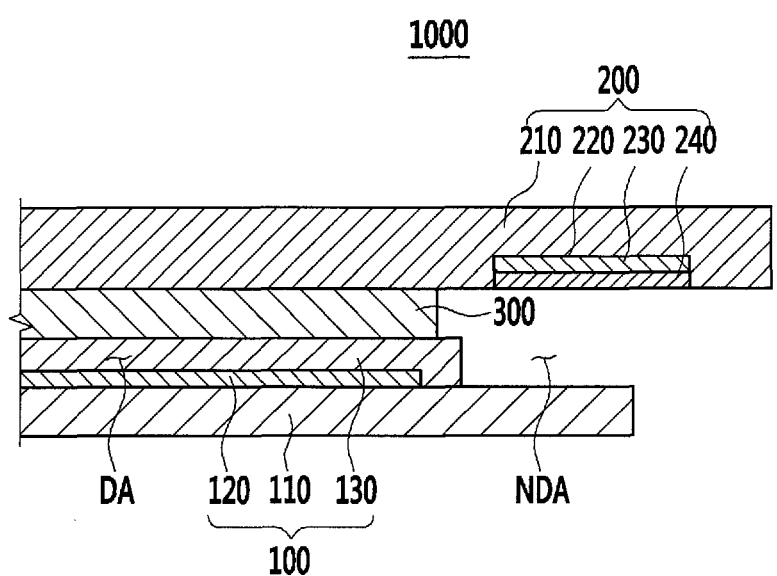
FIG. 2 is a cross-sectional view taken along II-II of the embodiment shown in FIG. 1.

FIG. 1 is a top plan view illustrating the display device 1000 according to the first exemplary embodiment. FIG. 2 is a cross-sectional view taken along II-II of FIG. 1.

As illustrated in FIGS. 1 and 2, the display device 1000 according to the first exemplary embodiment includes a display panel 100, a window 200, and a resin 300.

The display panel 100 includes a display area DA for displaying an image and a non-display area NDA neighboring (or adjacent) the display area DA. The non-display area NDA may surround the edges of the display area DA to form a closed loop. The display panel 100 includes a substrate 110, an organic light emitting diode (OLED) 120, and a thin film encapsulating layer 130.

The substrate 110 includes glass, resin, metal, and the like, and is made of a material having a characteristic such as light transmissivity, light reflectivity, light absorptiveness, light semi-transmissivity, and the like. The OLED 120 is positioned on the substrate 110, and both the substrate 110 and the thin film encapsulating layer 130 encapsulate the OLED 120. The substrate 110 and the thin film encapsulating layer 130 protect the OLED 120 from the external interference (or the external environment). The substrate 110 may be flexible. Because the substrate 110 is flexible and because the thin film encapsulating layer 130 is formed as a thin film, the entire display panel 100 may be flexible. The OLED 120 is on the substrate 110 and can be driven to emit the light to thereby display an image. A touch sensor may be formed on or attached to the thin film encapsulating layer 130.

Although the display panel 100 according to the first exemplary embodiment includes the OLED 120, display panels according to other exemplary embodiments may include liquid crystal, plasma, and the like.

The window 200 is positioned on the display panel 100, and is laminated on (or attached to) the display panel 100 by the resin 300, which may be an optically clear adhesive. The resin 300 is in a state hardened by a hardening method such as exposure to ultraviolet (UV) light and the like.

According to one embodiment, the window 200 includes a window main body 210, a groove 220, a touch portion 230, and a backlight unit 240.

The window main body 210 covers the display panel 100 in a region corresponding to the display area DA and the non-display area NDA of the display panel 100. The window main body 210 faces the display panel 100, and is made of a transparent material. The window main body 210 is made of a transparent material such as glass, resin, and the like, and functions to protect the display panel 100 from damage due to external impact. The window main body 210 faces the display panel 100 on the display panel 100 and covers the display panel 100. The window main body 210 is laminated on (or attached to) the display panel 100 by the resin 300 that is between the display panel 100 and the window 200, and protects the display panel 100 together with the resin 300, thereby improving the impact resistance of the display device 1000. The window main body 210 is formed to be larger than the display panel 100, but embodiments of the present invention are not limited thereto and thus, may be formed as size substantially equal to the size of the display panel 100. A light blocking layer that includes a metal such as chromium (Cr) and the like, an organic material including black pigment, and the like, may be formed on the window main body 210 in a region corresponding to the non-display area NDA to thereby block the external light.

Figure 3:
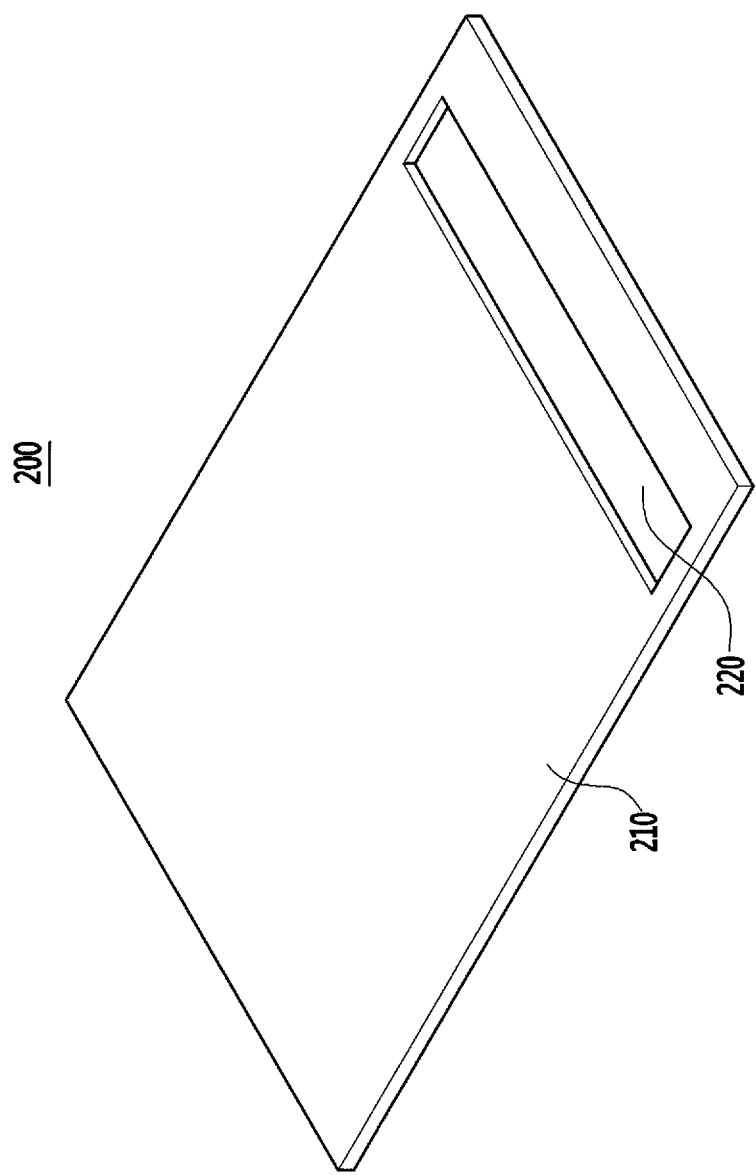
FIG. 3 is a perspective view illustrating a rear surface of a window of the embodiment shown in FIG. 1.

FIG. 3 is a perspective view illustrating a rear surface of a window of FIG. 1 according to one embodiment of the present invention.

As illustrated in FIGS. 1, 2, and 3, the groove 220 is recessed from the surface of the window main body 210 in a region corresponding to only the non-display area NDA of the display panel 100. Specifically, the groove 220 has the shape of a recess in the surface of the window main body 210 that faces the display panel 100, which is the rear surface of the window main body 210.

The groove 220 extends in one direction along a short side of the window main body 210 in a region corresponding to the non-display area NDA of the display panel 100. A pattern (or a predetermined pattern) may be formed on the window main body 210 in a region corresponding to the groove 220. For example, the pattern formed on the window main body 210 may be a touch recognition pattern that appears as an icon for receiving and/or recognizing a touch input from a user.

According to one embodiment of the present invention, the touch portion 230 is a touch sensor that is positioned within the groove 220 and that is configured to recognize touch. The touch portion 230 may use an impact (or pressure or resistive) type or a capacitive type touch sensor, and may be connected to a printed circuit board (PCB) connected to the OLED 120 of the display panel 100. For example, a touch signal indicating a touch recognized by the touch portion 230 may be transferred to the PCB, the touch signal transferred to the PCB may be converted to an image signal, and the converted image signal may be transferred to the OLED 120 to thereby transform an image displayed by the OLED 120. Connection between the touch portion 230 and the PCB may be made by a flexible PCB (FPCB).

The backlight unit 240 is adjacent the touch portion 230 and is positioned within the groove 220 to emit light toward the touch portion 230. The backlight unit 240 faces the display panel 100, but embodiments of the present invention are not limited thereto. For example, the backlight unit 240 may be positioned in the groove 220 to be covered by the touch portion 230. The backlight unit 240 may include a point light source, such as a light emitting diode (LED) for emitting light and the like and a light guide plate (LPG) for transforming the point light source to a surface light source, and the like. The backlight unit 240 may be connected to the PCB and connected with the OLED 120 through the FPCB, and may emit light toward the touch portion 230, thereby enabling the user to easily recognize (or identify) the touch portion 230. For example, when intensity of illumination around the display device 1000 is low, the backlight unit 240 may receive a lighting signal from the PCB to emit light, and the light emitted from the backlight unit 240 may be recognized by the user when viewed through the touch portion 230.

Figure 4:
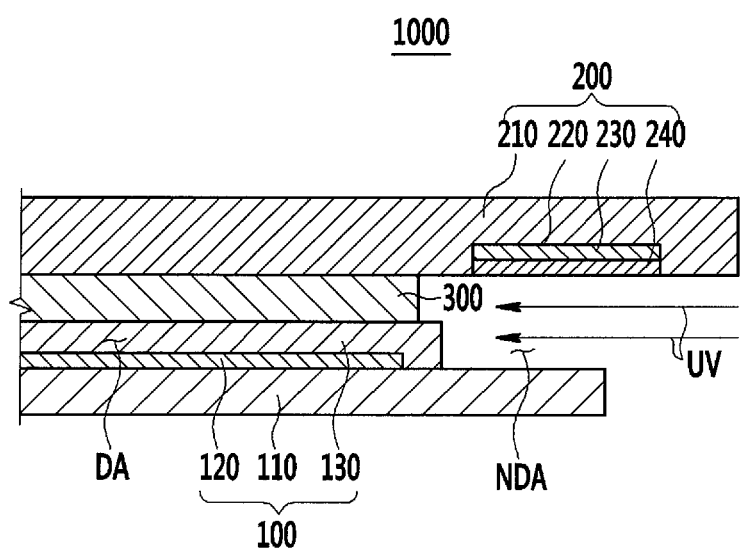
FIG. 4 is a cross-sectional view illustrating a portion of a display device and illustrating an effect of the display device according to the first exemplary embodiment of the present invention.

FIG. 4 is a cross-sectional view illustrating a portion of the display device 1000 to describe the effect of the display device 1000 according to the first exemplary embodiment.

As illustrated in FIG. 4, in the display device 1000 according to the first exemplary embodiment, the touch portion 230 and the backlight unit 240 are positioned within the groove 220 that is formed as a recess in the window main body 210. Therefore, the touch portion 230 and the backlight unit 240 do not protrude from the surface of the window main body 210 between the window 200 and the display panel 100 and thus, UV emitted from the side of the display device 1000 toward the resin 300 in order to laminate (or attach) the window 200 to the display panel 100 is not blocked by the touch portion 230 or the backlight unit 240. Accordingly, the resin 300 positioned between the window 200 and the display panel 100 is easily hardened by a hardening means such as UV and the like.

That is, the window 200 can be easily laminated onto the display panel 100 using the resin 300 to form the display device 1000 including the same.

Hereinafter, a display device 1002 according to a second exemplary embodiment of the present invention will be described with reference to FIG. 5.

Hereinafter, only a characteristic part different from the first exemplary embodiment will be emphasized and thereby described and thus, components not described below are described in the description made above with reference to the first exemplary embodiment. Further, for better comprehension and ease of description, like constituent elements used in the second exemplary embodiment will be described using like reference numerals used in the first exemplary embodiment.

Figure 5:
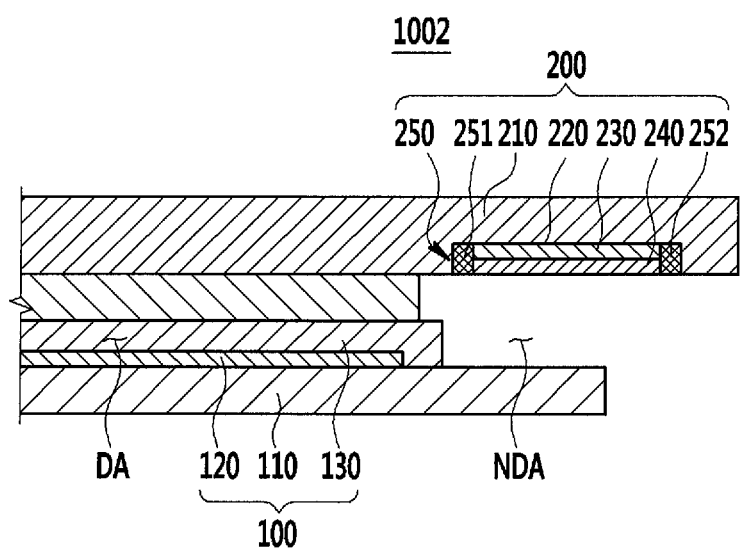
FIG. 5 is a cross-sectional view illustrating a portion of a display device according to a second exemplary embodiment of the present invention.

FIG. 5 is a cross-sectional view illustrating a portion of the display device 1002 according to the second exemplary embodiment of the present invention.

As illustrated in FIG. 5, the window 200 of the display device 1002 according to the second exemplary embodiment includes the window main body 210, the groove 220, the touch portion 230, the backlight unit 240, and a light blocking portion 250.

The light blocking portion 250 is adjacent an end portion of the backlight unit 240 and is positioned within an inner wall of the groove 220 (or between the backlight unit 240 and the inner wall of the groove 220). The light blocking portion 250 includes a first light blocking sub-portion 251 and a second light blocking sub-portion 252. The first light blocking sub-portion 251 and the second light blocking sub-portion 252 are spaced apart from each other by the touch portion 230 and the backlight unit 240, respectively, to thereby face each other.

The light blocking portion 250 includes a metal material such as Cr and the like, an organic material including black pigment, and the like, and is adapted to block light from leaking through an end portion of the backlight unit 240. That is, the light blocking portion 250 is positioned within the inner wall of the groove 220 (or between the backlight unit 240 and the inner wall of the groove 220) to block the light emitted from the backlight unit 240 toward the inner wall of the groove.

As described above, in the display device 1002 according to the second exemplary embodiment, the window 200 includes the light blocking portion 250 positioned within the inner wall of the groove 220 and thus, blocks light from leaking from the backlight unit 240 positioned within the groove 220 through the end portion of the backlight unit 240.

That is, provided is the display device 1002 including the window 200 that blocks the light from leaking from the backlight unit 240.

According to exemplary embodiments of the present invention, there are provided a window configured to be easily laminated onto a display panel using resin and a display device including the same.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A window configured to be laminated onto a display panel by resin, the display panel comprising a display area configured to display an image and a non-display area adjacent the display area, the window comprising:
    a window main body configured to cover the display panel;
    a groove in a region corresponding to the non-display area of the display panel, the groove being recessed from a surface of the window main body facing the display panel; and
    a touch portion within the groove and configured to recognize a touch.

2. The window of claim 1, wherein:
    the groove extends in one direction.

3. The window of claim 1, further comprising:
    a backlight unit adjacent the touch portion and within the groove, the backlight unit being configured to emit light.

4. The window of claim 3, further comprising:
    a light blocking portion adjacent an end portion of the backlight unit and between an inner wall of the groove and the backlight unit.

5. The window of claim 4, wherein:
    the light blocking portion comprises a first light blocking sub-portion and a second light blocking sub-portion facing the first light blocking sub-portion, the backlight unit being between the first light blocking sub-portion and the second light blocking sub-portion.

6. A display device comprising:
    a display panel comprising a display area configured to display an image and a non-display area adjacent the display area; and
    a window according to claim 1 laminated onto the display panel by resin.

7. The display device of claim 6, wherein:
    the display panel comprises an organic light emitting diode (OLED) configured to display the image.

* * * * *